(12) United States Patent
Durand

(10) Patent No.: US 7,080,436 B2
(45) Date of Patent: Jul. 25, 2006

(54) METHOD OF MANUFACTURING AN AXIALLY COLLAPSIBLE DRIVESHAFT

(75) Inventor: Robert D. Durand, Reading, PA (US)

(73) Assignee: Torque-Traction Technologies, LLC, Maumee, OH (US)

( * ) Notice: Subject to any disclaimer, the term of this patent is extended or adjusted under 35 U.S.C. 154(b) by 0 days.

(21) Appl. No.: 10/273,382

(22) Filed: Oct. 17, 2002

(65) Prior Publication Data

US 2003/0079327 A1    May 1, 2003

Related U.S. Application Data

(60) Provisional application No. 60/330,185, filed on Oct. 18, 2001.

(51) Int. Cl.
  *B23P 17/00*   (2006.01)
  *F16C 1/26*    (2006.01)

(52) U.S. Cl. .................. 29/421.1; 29/897.2; 72/56; 72/58; 72/59; 72/370.22; 464/175

(58) Field of Classification Search ............. 29/421.1, 29/469.5, 897.2, 523; 72/59, 370.22, 56, 72/58; 464/162, 175
See application file for complete search history.

(56) References Cited

U.S. PATENT DOCUMENTS

| | | | | |
|---|---|---|---|---|
| 1,522,051 A | * | 1/1925 | Fulton et al. | 72/59 |
| 3,412,628 A | * | 11/1968 | De Gain | 74/492 |
| 3,520,163 A | * | 7/1970 | Otoda | 72/59 |
| 3,564,688 A | * | 2/1971 | De Gain | 29/897.2 |
| 3,577,621 A | * | 5/1971 | De Gain | 29/897.2 |
| 3,625,040 A | * | 12/1971 | De Gain | 72/59 |
| 3,698,259 A | * | 10/1972 | Reeves | 74/492 |
| 3,699,624 A | * | 10/1972 | De Gain | 29/897.2 |
| 4,319,471 A | * | 3/1982 | Benteler et al. | 72/59 |
| 4,364,252 A | * | 12/1982 | Koizumi | 72/59 |
| 4,540,385 A | | 9/1985 | Krude | |
| 4,751,835 A | | 6/1988 | Galaniuk et al. | |
| 5,299,982 A | * | 4/1994 | Burton | 464/133 |
| 5,461,767 A | * | 10/1995 | Okubo | 29/454 |
| 5,561,902 A | | 10/1996 | Jacobs et al. | |
| 5,611,135 A | | 3/1997 | Breese | |

(Continued)

FOREIGN PATENT DOCUMENTS

EP    707157 A1 *    4/1996

(Continued)

*Primary Examiner*—Essama Omgba
(74) *Attorney, Agent, or Firm*—MacMillan, Sobanski & Todd, LLC

(57) ABSTRACT

A method for manufacturing a driveshaft for use in a vehicle drive train system that is axially collapsible in the event of a collision to absorb energy. A workpiece, such as a hollow cylindrical tube, is deformed by hydroforming to provide an axial collapse initiation zone. The axial collapse initiation zone can be defined by a plurality of axially extending undulations or corrugations that are formed in a central portion of the tube. The axial collapse initiation zone is designed to accommodate the transmission of torque through the driveshaft without any deformation under normal operating conditions. However, if a relatively large axial force is applied to the front and rear end portions of the driveshaft, the axial collapse initiation zone is designed to allow relative axial movement to occur between the front and rear end portions of the driveshaft. Such collapsing functions to absorb energy during a collision, thereby providing additional safety to the occupants of the vehicle. If desired, the driveshaft can be hydroformed to include integral yoke portions on the ends thereof.

4 Claims, 4 Drawing Sheets

U.S. PATENT DOCUMENTS

| | | | |
|---|---|---|---|
| 5,655,968 A * | 8/1997 | Burton | 464/133 |
| 5,981,921 A * | 11/1999 | Yablochnikov | 219/603 |
| 5,983,497 A | 11/1999 | Breese et al. | |
| 6,015,350 A * | 1/2000 | Breese | 464/162 |
| 6,105,413 A | 8/2000 | Duggan et al. | |
| 6,122,948 A * | 9/2000 | Moses | 72/61 |
| 6,193,612 B1 * | 2/2001 | Craig et al. | 464/162 |
| 6,254,488 B1 | 7/2001 | Hill | |
| 6,261,183 B1 * | 7/2001 | Duggan et al. | 464/134 |
| 6,371,859 B1 * | 4/2002 | Gibson | 464/183 |
| 6,454,657 B1 * | 9/2002 | Duggan | 464/134 |
| 6,484,384 B1 * | 11/2002 | Gibson et al. | 29/516 |
| 6,497,030 B1 * | 12/2002 | Marando | 29/421.1 |
| 6,523,407 B1 * | 2/2003 | Breese | 73/457 |
| 6,543,266 B1 * | 4/2003 | Jaekel | 72/61 |
| 6,666,772 B1 * | 12/2003 | Cheney et al. | 464/183 |
| 6,754,943 B1 * | 6/2004 | Perry et al. | 29/421.1 |
| 6,820,317 B1 * | 11/2004 | Okada | 29/421.1 |
| 6,826,943 B1 * | 12/2004 | Rempe et al. | 72/370.06 |
| 6,862,910 B1 * | 3/2005 | Amborn | 72/62 |
| 6,893,353 B1 * | 5/2005 | Dutkiewicz et al. | 464/167 |
| 6,912,884 B1 * | 7/2005 | Gharib | 72/58 |
| 6,959,476 B1 * | 11/2005 | Li et al. | 29/421.1 |
| 7,007,362 B1 * | 3/2006 | Gibson | 29/419.2 |
| 7,025,686 B1 * | 4/2006 | Aiken | 464/162 |
| 2005/0003897 A1 * | 1/2005 | Wagner et al. | 464/136 |
| 2005/0028341 A1 * | 2/2005 | Durand et al. | 29/421.1 |
| 2006/0005393 A1 * | 1/2006 | Wagner et al. | 29/897.2 |

FOREIGN PATENT DOCUMENTS

| | | |
|---|---|---|
| GB | 2371614 A * | 7/2002 |
| GB | 2380958 A * | 4/2003 |
| WO | 01/14077 A1 | 3/2001 |

* cited by examiner

METHOD OF MANUFACTURING AN AXIALLY COLLAPSIBLE DRIVESHAFT

CROSS REFERENCE TO RELATED APPLICATION

This application claims the benefit of U.S. Provisional Application No. 60/330,185, filed Oct. 18, 2001, the disclosure of which is incorporated herein by reference.

BACKGROUND OF THE INVENTION

This invention relates in general to drive train systems for transferring rotational power from a source of rotational power to a rotatably driven mechanism. In particular, this invention relates to an improved method for manufacturing a driveshaft for use in such a drive train system that is axially collapsible in the event of a collision to absorb energy.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

A recent trend in the development of passenger, sport utility, pickup truck, and other vehicles has been to design the various components of the vehicle in such a manner as to absorb energy during a collision, thereby providing additional safety to the occupants of the vehicle. As a part of this trend, it is known to design the drive train systems of vehicles so as to be axially collapsible so as to absorb energy during a collision. To accomplish this, the driveshaft tube may be formed as an assembly of first and second driveshaft sections that are connected together for concurrent rotational movement during normal operation, yet which are capable of moving axially relative to one another when a relatively large axially compressive force is applied thereto, such as can occur during a collision. A variety of such axially collapsible driveshaft assemblies are known in the art. However, such two-piece axially collapsible driveshaft assemblies are relatively time consuming and expensive to manufacture. Thus, it would be desirable to provide an improved method for manufacturing a driveshaft for use in a vehicular drive train system that is axially collapsible in the event of a collision to absorb energy and that is relatively simple and inexpensive in structure.

SUMMARY OF THE INVENTION

This invention relates to improved method for manufacturing a driveshaft for use in a vehicle drive train system that is axially collapsible in the event of a collision to absorb energy. A workpiece, such as a hollow cylindrical tube, is deformed by hydroforming to provide an axial collapse initiation zone. The axial collapse initiation zone can be defined by a plurality of axially extending undulations or corrugations that are formed in a central portion of the tube. The axial collapse initiation zone is designed to accommodate the transmission of torque through the driveshaft without any deformation under normal operating conditions. However, if a relatively large axial force is applied to the front and rear end portions of the driveshaft, the axial collapse initiation zone is designed to allow relative axial movement to occur between the front and rear end portions of the driveshaft. Such collapsing functions to absorb energy during a collision, thereby providing additional safety to the occupants of the vehicle. If desired, the driveshaft can be hydroformed to include integral yoke portions on the ends thereof.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
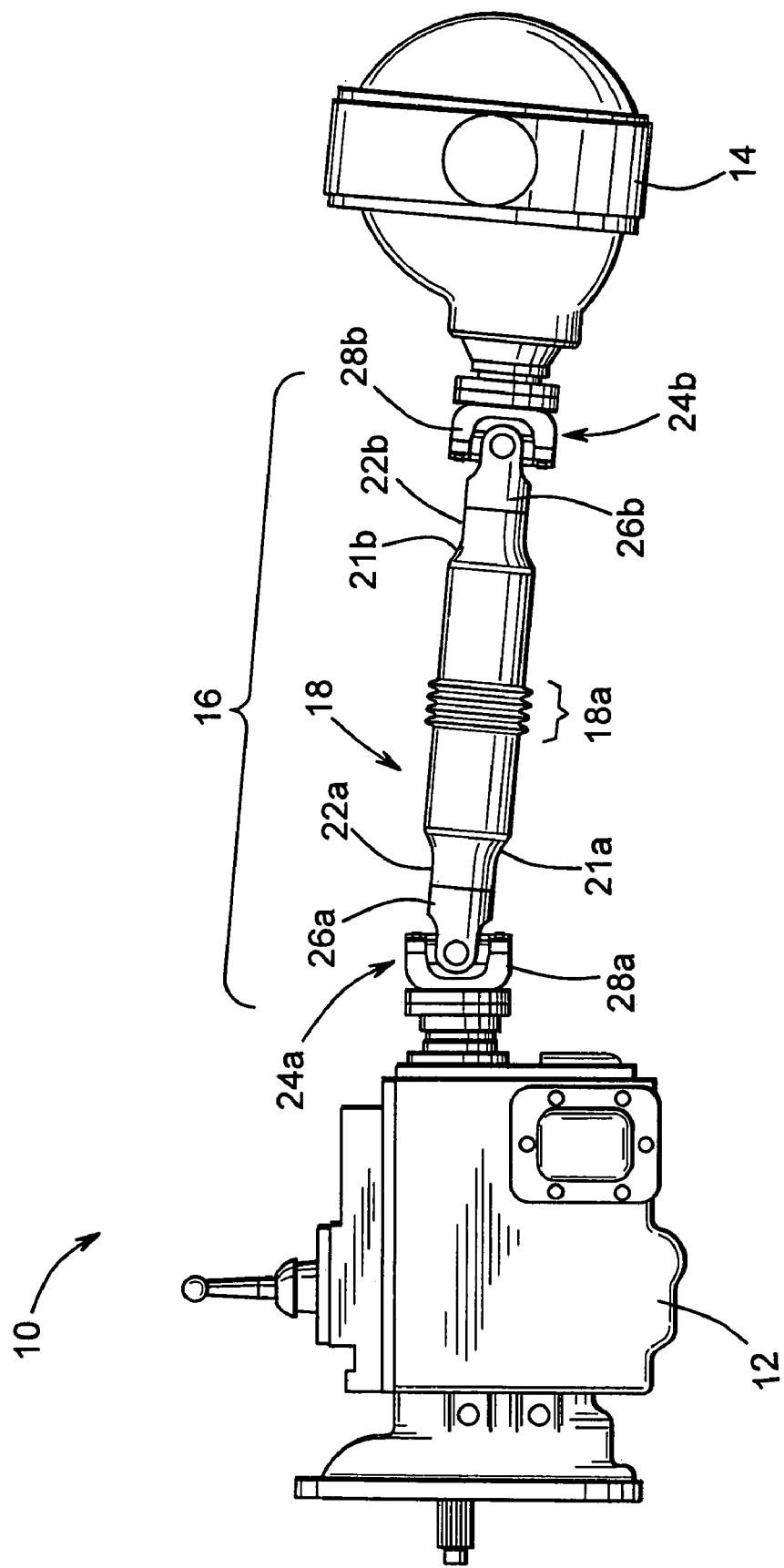
FIG. 1 is a schematic side elevational view of a vehicle drive train system including an axially collapsible driveshaft that has been manufactured in accordance with a first embodiment of the method of this invention.

Referring now to the drawings, there is illustrated in FIG. 1 a drive train system, indicated generally at 10, for a vehicle that is adapted to transmit rotational power from an engine/transmission assembly to a plurality of driven wheels (not shown). The illustrated drive train system 10 is generally conventional in the art and is intended merely to illustrate one environment in which this invention may be used. Thus, the scope of this invention is not intended to be limited for use with the specific structure for the vehicle drive train system 10 illustrated in FIG. 1 or to vehicle drive train systems in general.

The drive train system 10 includes a transmission 12 having an output shaft (not shown) that is connected to an input shaft (not shown) of an axle assembly 14 through a driveshaft assembly 16. The transmission 12 is rotatably driven by an engine (not shown) or other source of rotational power in a conventional manner. The driveshaft assembly 16 includes a generally hollow and cylindrical driveshaft tube, indicated generally at 18. The driveshaft tube 18 includes a center portion extending between a pair of opposed end portions 22a and 22b. An axial collapse initiation zone 18a is formed in the driveshaft tube 18 between the end portion 22a and 22b. The structure, method of manufacture, and mode of operation of the axial collapse initiation zone 18a will be discussed below. In the illustrated embodiment, the center portion of the driveshaft tube 18 is formed having a larger outer diameter than either of the end portions 22a and 22b. Thus, respective transition regions 21a and 21b are defined between the larger diameter center portion of the illustrated driveshaft 18 and each of the smaller diameter end portions 22a and 22b thereof. However, the driveshaft tube 18 may be formed having a constant diameter throughout the length thereof or any other desired shape. Alternatively, the single driveshaft tube 18 may be replaced by a compound driveshaft assembly (not shown) having separate first and second driveshaft sections that are supported by a center bearing assembly between the transmission 12 and the axle assembly 14. The driveshaft tube 18 can be formed from any suitable material, such as a lightweight aluminum alloy (6061 alloy, for example), steel, and the like.

The output shaft of the transmission 12 and the input shaft of the axle assembly 14 are typically not co-axially aligned for rotation. To accommodate this, a pair of universal joints, indicated generally at 24a and 24b, are provided at the end portions 22a and 22b of the driveshaft tube 18 to respectively connect the driveshaft tube 18 to the output shaft of the transmission 12 and to the input shaft of the axle assembly 14. The first universal joint 24a includes a first yoke, such as a tube yoke 26a, that is secured to the front end portion 22a of the driveshaft tube 18 by any conventional means, such as by welding or adhesives. The first universal joint 24a further includes a second yoke, such as a half round end yoke 28a, that is connected to the output shaft of the transmission 12. Similarly, the second universal joint 24b includes a first yoke, such as a tube yoke 26b, that is secured to the rear end portion 22b of the driveshaft tube 18 by any conventional means, such as by welding or adhesives. The second universal joint 24b further includes a second yoke, such as a half round end yoke 28b, that is connected to the input shaft of the axle assembly 14.

Figure 2:
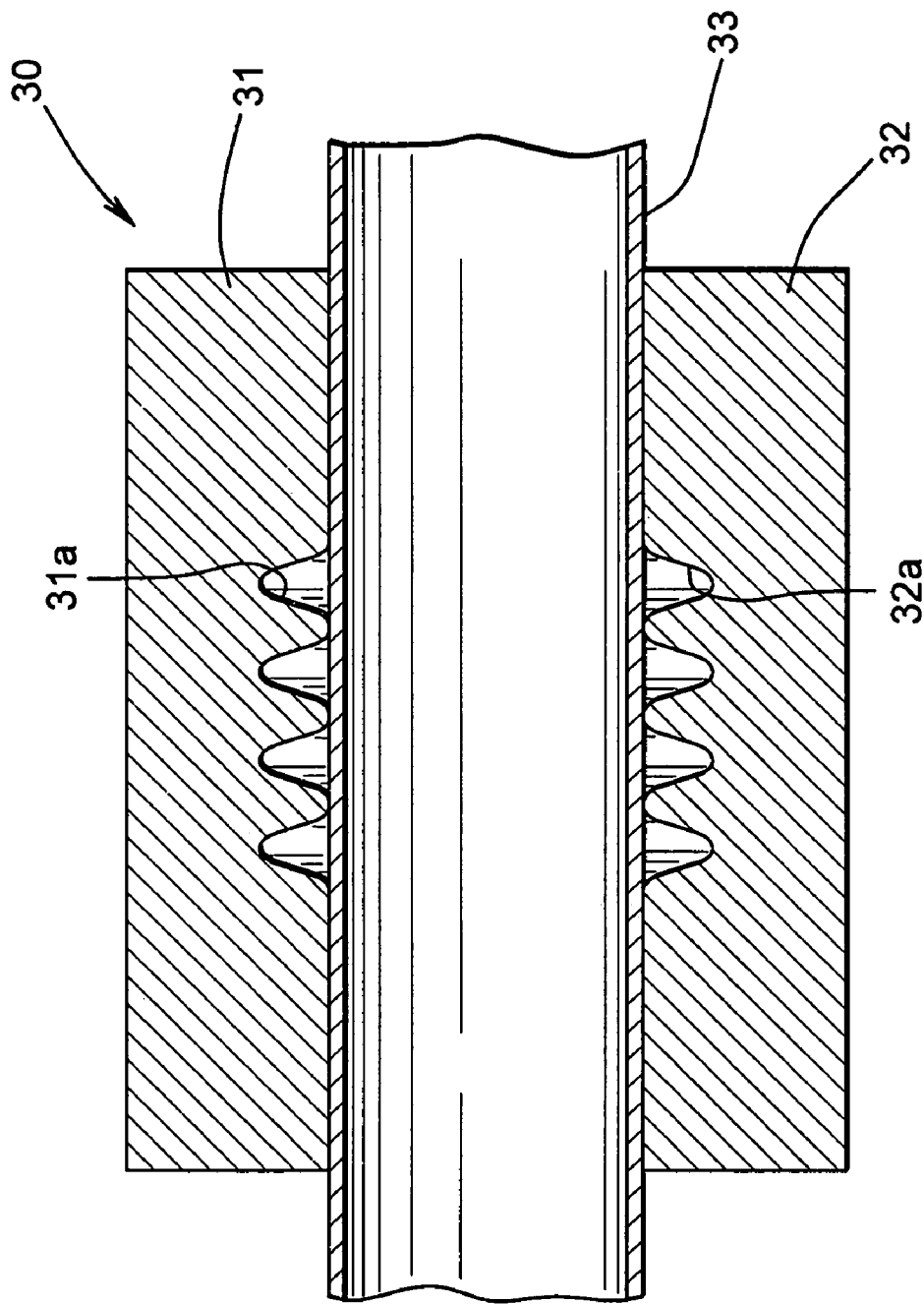
FIG. 2 is an enlarged sectional elevational view of a hydroforming die having a portion of a workpiece disposed therein prior to deformation to become the axially collapsible driveshaft illustrated in FIG. 1.
Figure 3:
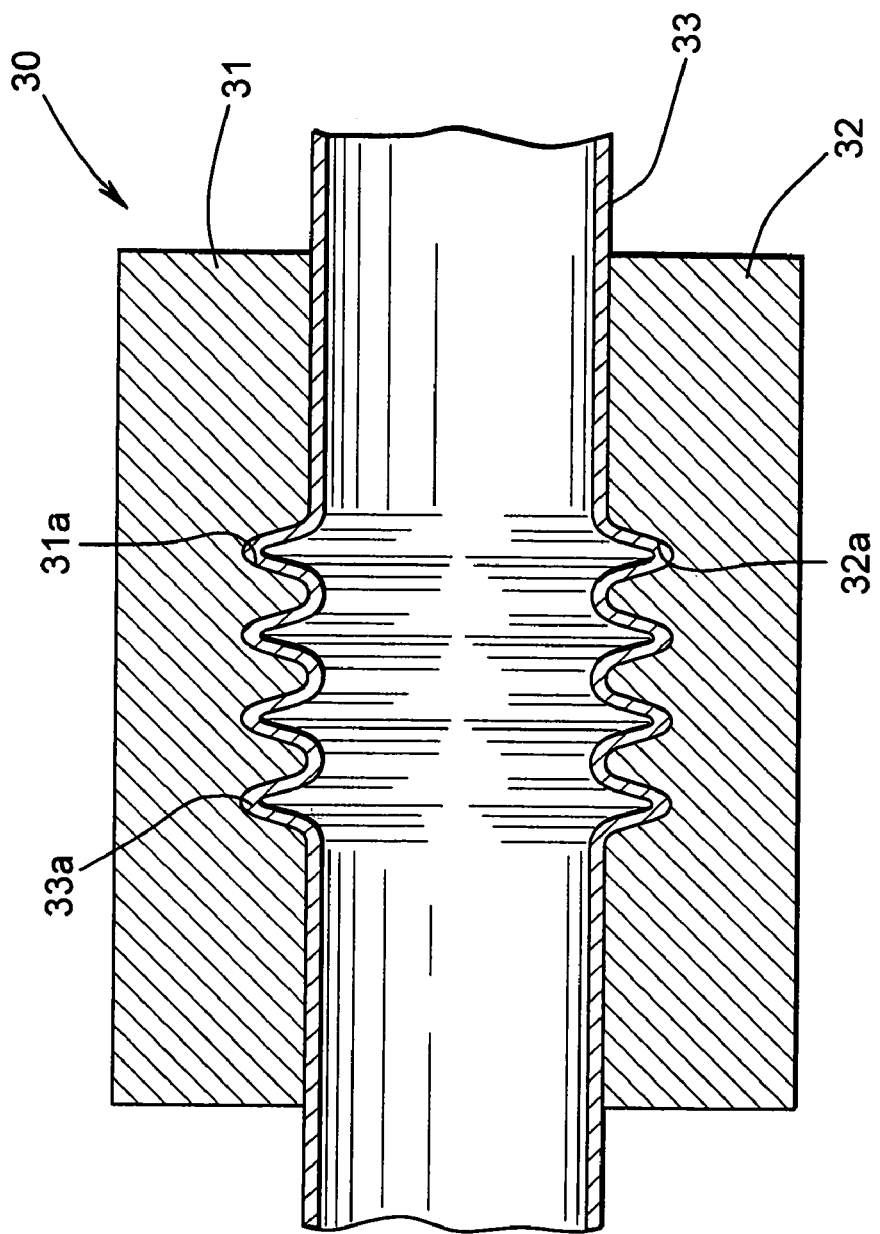
FIG. 3 is an enlarged sectional elevational view of the hydroforming die illustrated in FIG. 2 showing the portion of the axially collapsible driveshaft after deformation.

Referring now to FIGS. 2 and 3, a first embodiment of a method of manufacturing the driveshaft tube 18 is illustrated in detail. Initially, a hydroforming die, indicated generally at 30, is provided that includes a pair of opposed die sections 31 and 32. The die sections 31 and 32 are supported for relative movement between opened and closed positions within a hydroforming apparatus (not shown). The hydroforming apparatus is, of itself, conventional in the art and includes a stationary portion (typically referred to as a bed) having the second die section 32 secured thereto, a movable portion (typically referred to as a slide or ram) having the first die section 31 secured thereto, and an actuating mechanism for selectively moving the slide toward and away from the bed. As best shown in FIG. 2, the die sections 31 and 32 have cooperating recesses 31a and 32a formed therein that together define an internal die cavity having a predetermined shape. The illustrated die cavity of the forming die 30 has a cross sectional shape that is generally axially undulating or corrugated. However, the die cavity may be formed having any other desired cross sectional shape that is capable of providing an axial collapse initiation zone in the driveshaft 18 in the manner described below.

To begin the manufacturing process, the die sections 31 and 32 are initially moved to the opened position, wherein the die sections 31 and 32 are spaced apart from one another to allow a workpiece 33, such as the illustrated hollow cylindrical tube, to be inserted therebetween. Then, the die sections 31 and 32 of the forming die 30 are moved to the closed position about the tube 33, as shown in FIG. 2. When moved to this closed position, the die sections 31 and 32 are disposed adjacent to one another so as to enclose the workpiece 33 within the die cavity. Although the die cavity is usually somewhat larger than the workpiece 33 to be hydroformed, movement of the slide toward the bed may, in some instances, cause some mechanical deformation of the workpiece 33.

Next, as shown in FIG. 3, the workpiece 33 is then filled with a fluid, typically a relatively incompressible liquid such as water. The pressure of the fluid within the workpiece 33 is increased to such a magnitude that the portion of the workpiece 33 disposed within the die cavity is deformed outwardly into conformance with the recesses 31a and 32a of the die sections 31 and 32, respectively. As a result of this deformation, the portion of the workpiece 33 is formed having a plurality of axially extending undulations or corrugations 33a. This plurality of corrugations 33a defines the axial collapse initiation zone 18a discussed above. Thereafter, the slide is moved away from the bed such that the die sections 31 and 32 are spaced apart from one another, allowing the deformed workpiece 33 to be removed and the next workpiece to be deformed to be inserted therebetween.

During normal operation of the drive train system 10, torque is transmitted from the transmission 12 through the driveshaft assembly 16 to the axle assembly 14. As discussed above, the front end portion 22a of the driveshaft 18 is connected to the output shaft of the transmission 12 by the first universal joint 24a, and the rear end portion 22b of the driveshaft 18 is connected to the input shaft of the axle assembly 14 by the second universal joint 24b. The axial collapse initiation zone 18a in the driveshaft 18 (as defined by the corrugations 33a) is designed to accommodate the transmission of such torque without any deformation under normal operating conditions. Thus, during such normal operation of the drive train system 10, no relative axial movement occurs between the front and rear end portions 22a and 22b of the driveshaft 18.

However, if a relatively large axial force is applied to the front and rear end portions 22a and 22b of the driveshaft 18, the axial collapse initiation zone 18a is designed to allow relative axial movement to occur between the front and rear end portions 22a and 22b of the driveshaft 18. This occurs because the axial collapse initiation zone 18a represents a portion of the driveshaft 18 that is relatively weaker in axial strength than the other portions of the driveshaft 18. Thus, when a relatively large axial force is applied to the front and rear end portions 22a and 22b of the driveshaft 18, such as might occur during a front-end impact of the vehicle with another object, the overall length of the driveshaft 18 collapses or axially shortens, thereby absorbing energy during this process. Such collapsing functions to absorb energy during a collision, thereby providing additional safety to the occupants of the vehicle. Accordingly, the axial collapse initiation zone 18a may be formed having any desired configuration that accommodates this function.

Figure 4:
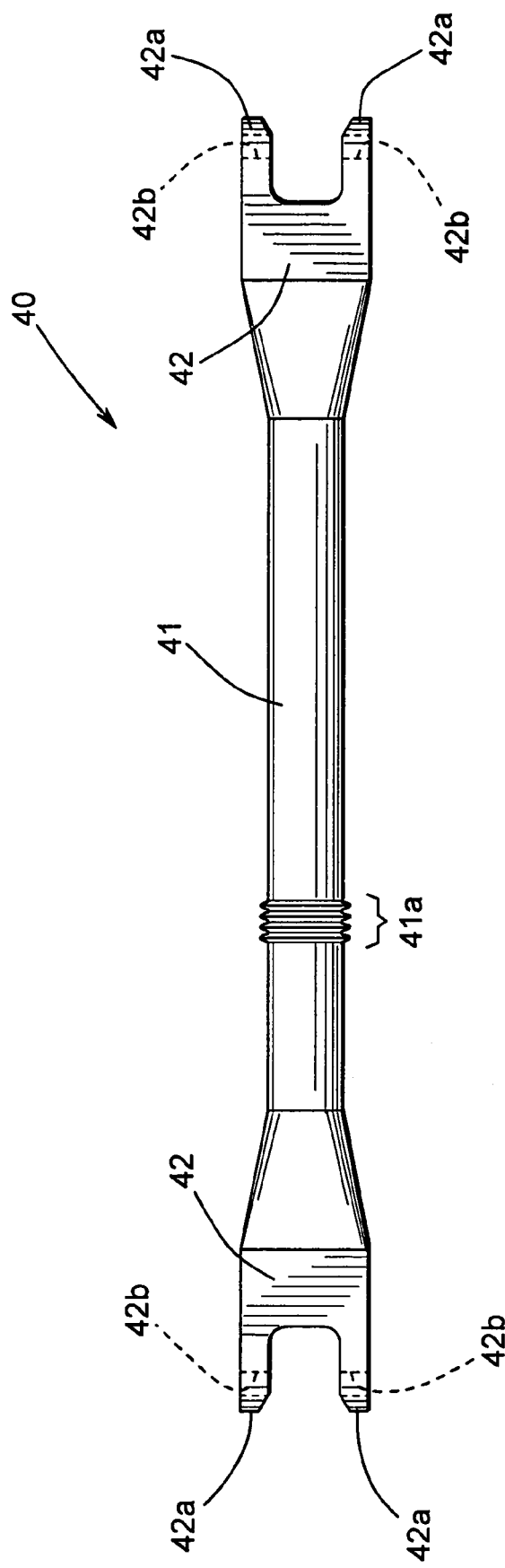
FIG. 4 is a side elevational view of an axially collapsible driveshaft that has been manufactured in accordance with a second embodiment of the method of this invention.

Referring now to FIG. 4, there is illustrated an axially collapsible driveshaft, indicated generally at 40, that has been manufactured in accordance with a second embodiment of the method of this invention. The modified driveshaft 40 includes a center portion 41 extending between a pair of integral opposed yoke portions 42. An axial collapse initiation zone 41a is formed in the center portion of the driveshaft 40 between the yoke portion 42. Each of the yoke portions 42 includes a pair of opposed arms 42a having aligned openings 42b formed therethrough. The entire modified driveshaft 40, including the axial collapse initiation zone 41*a* and the yoke portions 42, can be manufactured from tubular stock by hydroforming in the manner described above. Following such hydroforming, it may be necessary or desirable to remove some of the material at the ends of the workpiece to create the yoke portions 42.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a driveshaft assembly for use in a drive train system comprising the steps of:
    (a) providing a hollow workpiece including a center portion extending between a pair of end portions;
    (b) providing a die that defines a die cavity having a predetermined shape;
    (c) disposing the center portion of the hollow workpiece within the die cavity of the die; and
    (d) deforming the center portion of the hollow workpiece outwardly into conformance with the die cavity of the die so as to provide an axial collapse initiation zone therein, and deforming the pair of end portions of the hollow workpiece outwardly into conformance with the die cavity of the die so as to provide a pair of yokes therein.

2. The method defined in claim 1 wherein said step (a) is performed by providing a hollow cylindrical workpiece.

3. The method defined in claim 1 wherein said step (b) is performed by providing a die cavity having a plurality of axially extending undulations.

4. The method defined in claim 1 wherein said step (d) is performed by hydroforming.

* * * * *